US006677975B1

(12) United States Patent
Kerr

(10) Patent No.: US 6,677,975 B1
(45) Date of Patent: Jan. 13, 2004

(54) SYSTEM AND PROCESS FOR MAGNETIC ALIGNMENT OF AN IMAGING SUBSYSTEM

(75) Inventor: Roger S. Kerr, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 6 days.

(21) Appl. No.: 10/175,490

(22) Filed: Jun. 19, 2002

(51) Int. Cl.[7] .................................................. G01B 3/30

(52) U.S. Cl. .......................... 347/263; 33/614; 33/645; 33/DIG. 1

(58) Field of Search ............................ 29/281.1, 281.6, 29/700; 33/412, 533, 614, 645, DIG. 1; 101/479, 481; 347/37, 49, 108, 152, 170, 222, 245, 263; 400/354.3; 346/138

(56) References Cited

U.S. PATENT DOCUMENTS

| | | | | |
|---|---|---|---|---|
| 3,869,569 A | | 3/1975 | Mason et al. | 358/476 |
| 4,553,335 A | * | 11/1985 | Woyton | 33/645 |
| 5,046,262 A | * | 9/1991 | Kerbaugh | 33/644 |
| 5,053,791 A | | 10/1991 | Baek et al. | 346/138 |
| 5,070,302 A | | 12/1991 | Marcus et al. | 324/662 |
| 5,164,742 A | | 11/1992 | Baek et al. | 347/234 |
| 5,168,288 A | | 12/1992 | Baek et al. | 347/240 |
| 5,175,564 A | | 12/1992 | Jamzadeh | 347/116 |
| 5,203,942 A | | 4/1993 | DeCook et al. | 156/230 |
| 5,214,444 A | | 5/1993 | Kerr et al. | 347/238 |
| 5,260,714 A | | 11/1993 | DeCook et al. | 347/264 |
| 5,268,708 A | | 12/1993 | Harshbarger et al. | 346/134 |
| 5,270,731 A | | 12/1993 | Kerr et al. | 346/24 |
| 5,276,464 A | | 1/1994 | Kerr et al. | 346/134 |
| 5,301,099 A | | 4/1994 | Kerr | 346/138 |
| 5,323,180 A | | 6/1994 | Kuberka et al. | 347/215 |
| 5,341,159 A | | 8/1994 | Kerr | 346/134 |
| 5,376,954 A | | 12/1994 | Kerr | 346/138 |
| 5,446,477 A | | 8/1995 | Baek et al. | 346/138 |
| 5,478,434 A | | 12/1995 | Kerr et al. | 156/584 |
| 5,777,658 A | | 7/1998 | Kerr et al. | 347/215 |
| 5,838,345 A | | 11/1998 | Kerr et al. | 347/37 |

(List continued on next page.)

OTHER PUBLICATIONS

Kerr et al., "Image Processing Apparatus and Method for Simultaneously Scanning and Proofing", USSN 09/945,922, filed Sep. 4, 2001.

Kerr, "Image Producing Process and Apparatus with Magnetic Load Roller", USSN 09/942,894, Filed Aug. 30, 3001.

*Primary Examiner*—Stephen D. Meier
*Assistant Examiner*—Blaise L. Mouttet
(74) *Attorney, Agent, or Firm*—The Harleston Law Firm, LLC

(57) ABSTRACT

An accurate system (501) for the magnetic alignment of an imaging subsystem (468) of an image processing apparatus (10) includes:

1) a master alignment fixture (534) including: a) two like, magnet-attracting translation-bearing rods (206, 208); b) a drum axis tool (526) or drum (300); c) a device (535) for supporting the translation-bearing rods (206, 208) in a parallel, planar relationship; d) a device (540) for supporting the drum axis tool (526) or drum (300) parallel to the translation-bearing rods (206, 208); and e) a device (546) for measuring and aligning the translation-bearing rods (206, 208) in relation to the parallel drum axis tool (526) or drum (300); and
2) a removable set apparatus (502) attachable to the master alignment fixture (534), including: a) a tube (506) or rod; b) aligned, downwardly extending first set arms (510) with magnets (518) attached, the magnets being detachably attachable to the translation-bearing rod; and c) at least two second, extended arms (511) that are detachably attachable to the drum axis tool (526) or drum (300). A process for magnetically aligning an imaging subsystem is also included herein.

21 Claims, 11 Drawing Sheets

U.S. PATENT DOCUMENTS 5,909,237 A 6/1999 Kerr et al. .................. 347/262
6,002,419 A 12/1999 Kerr et al. .................. 347/233
6,014,162 A 1/2000 Kerr et al. .................. 347/262
6,034,713 A 3/2000 Kerr et al. .................. 347/257
6,037,960 A 3/2000 Kerr et al. .................. 347/172
6,208,368 B1 * 3/2001 Kerr ........................... 347/242
6,249,300 B1 6/2001 Kerr et al. .................. 347/198
6,313,859 B1 11/2001 Kerr et al. .................. 347/217
6,400,387 B1 6/2002 Kerr ........................... 347/198

* cited by examiner

SYSTEM AND PROCESS FOR MAGNETIC ALIGNMENT OF AN IMAGING SUBSYSTEM

FIELD OF THE INVENTION

The present invention relates to an apparatus and method for the magnetic alignment of an imaging subsystem having linear translation-bearing rods.

BACKGROUND OF THE INVENTION

Pre-press proofing is a procedure that is used by the printing industry for creating representative images of printed material without the high cost and time that is required to actually produce printing plates and set up a high-speed, high volume, printing press to produce an example of an intended image. An image may require several corrections and be reproduced several times to satisfy or meet the customers requirements resulting in loss of profits and ultimately higher costs to the customer.

One such commercially available image processing apparatus is arranged to form an intended image on a sheet of print media. Colorant is transferred from a sheet of donor material to print media to form the intended image. This image processing apparatus generally includes a material supply assembly or carousel, and a lathe bed scanning subsystem or write engine, which includes a lathe bed scanning frame, translation drive, translation stage member, printhead, load roller, and imaging drum, and print media and donor material transports.

The printhead is mounted on the movable translation stage member, which is supported on translation-bearing rods. The linear translation subsystem includes the translation stage member, the translation-bearing rods, and the translator drive. The front translation-bearing rod locates the translation stage member in the vertical and the horizontal directions with respect to axis X of the imaging drum. The rear translation-bearing rod locates the translation stage member only with respect to rotation of the translation stage member about the front translation-bearing rod. The translator drive traverses the translation stage member and printhead axially along the imaging drum.

The translation subsystem also includes the lead screw subassembly. The lead screw includes an elongated, threaded shaft, which is attached to the translator linear drive motor on its drive end and to the lathe bed scanning frame by means of a radial bearing. A lead screw drive nut includes grooves in its hollowed-out center portion for mating with the threads of the threaded shaft. This allows the lead screw drive nut axial movement along the threaded shaft as the threaded shaft is rotated by the linear drive motor. The lead screw drive nut is integrally attached to the printhead through the lead screw coupling and the translation stage member at its periphery, so that the threaded shaft is rotated by the linear drive motor. This moves the lead screw drive nut axially along the threaded shaft, which in turn moves the translation stage member, and ultimately the printhead axially along the imaging drum. The printhead travels in a path along the drum.

Although the presently known and utilized image processing (or imaging) apparatus is satisfactory, it is not without drawbacks. Drawbacks include the following. First, misalignment of the linear translation subsystem limits output quality. Image quality of the intended image, intended image to intended image, and the intended image from imaging apparatus to imaging apparatus suffers when the imaging subsystem is mis-aligned. Also, the intended image, intended image to intended image within a given imaging apparatus, or intended image to intended image from one imaging apparatus to another imaging apparatus may differ. The same is true of the alignment of the printhead to the imaging drum surface or the print media and colorant donor material. With existing imaging (or image processing) apparatus, alignment of the linear translation subsystem, and the printhead relative to the imaging drum surface or the print media and colorant donor material, is limited by the constraints imposed by currently available manufacturing technology.

For example, currently available image processing apparatus have fixed translation-bearing rods, which, even though they may fall within manufacturing specifications, are often very slightly bowed. Even a slight bowing can interfere with the performance of the image processing system containing the bowed translation-bearing rod or rods.

The present invention reduces or eliminates reliance on tight manufacturing tolerances for translation-bearing rods by pre-aligning the linear translation subsystem prior to use of the image processing apparatus containing the linear translation subsystem. Once the aligning process of the present invention has been conducted, it is not necessary to re-align the imaging subsystem for many years.

Advantages of the present invention include the following. First, the aligned linear translation subsystem of the imaging subsystem provides an increase in image quality of the intended image, intended image to intended image, and the intended image from imaging apparatus to imaging apparatus. Second, the need to automatically focus the printhead is reduced or eliminated by improved alignment of the linear translation subsystem and printhead to the imaging drum surface, and also to the print media and the colorant donor material. Third, the linear translation subsystem is aligned, as is the printhead to the imaging drum surface, print media, and colorant donor material. This considerably reduces final costs and required maintenance of the imaging apparatus. Finally, the present invention provides an added margin for depth of focus, and for handling a larger range of media thickness tolerances.

SUMMARY OF THE INVENTION

The present invention includes an accurate system for magnetic alignment of an imaging subsystem, including:

1) a master alignment fixture, including: a) two like, magnet-attracting translation-bearing rods; b) a drum axis tool or drum; c) a means for supporting the translation-bearing rods in a parallel, planar relationship to one another; d) a means for supporting the drum axis tool or drum in a parallel relationship to the translation-bearing rods; and e) a means for measuring and aligning the translation-bearing rods in relation to the parallel drum axis tool or drum; and 2) a removable set apparatus that is attachable to the top of the master alignment fixture, including: a) a tube or rod; b) a plurality of aligned first set arms extending in a downward direction from the tube or rod, at least one magnet being attached to each first set arm, the first set arms being above and in close proximity to the translation-bearing rods when the set apparatus is on the master alignment fixture, the magnets of the first set arms being detachably attachable to the translation-bearing rod; and c) at least two second, extended arms projecting from a side of the tube or rod, the second, extended arms being detachably attachable to the drum axis tool or drum.

The present invention also includes a process for magnetically aligning an imaging subsystem, comprising the steps of:

a) mounting one or two translation-bearing rods, and a drum axis tool or a drum, in a master alignment fixture;

b) placing a removable set apparatus over the master alignment fixture, thereby removably attaching at least two loosely set magnets on at least one, first pair of arms of the set apparatus to the translation-bearing rods, and at least two magnets on a second, extended pair of arms of the set apparatus to the drum axis tool or drum;

c) adjusting the translation-bearing rods relative to the drum axis tool or drum;

d) fixing the translation-bearing rod magnets on the set apparatus in their adjusted positions;

e) removing the set apparatus from the master alignment fixture; and f) inserting the set apparatus in an imaging subsystem of an image processing apparatus for aligning the imaging subsystem.

BRIEF DESCRIPTION OF THE DRAWINGS

A more complete understanding of the invention and its advantages will be apparent from the detailed description taken in conjunction with the accompanying drawings, wherein examples of the invention are shown, and wherein.

DETAILED DESCRIPTION OF THE INVENTION

Figure 1:
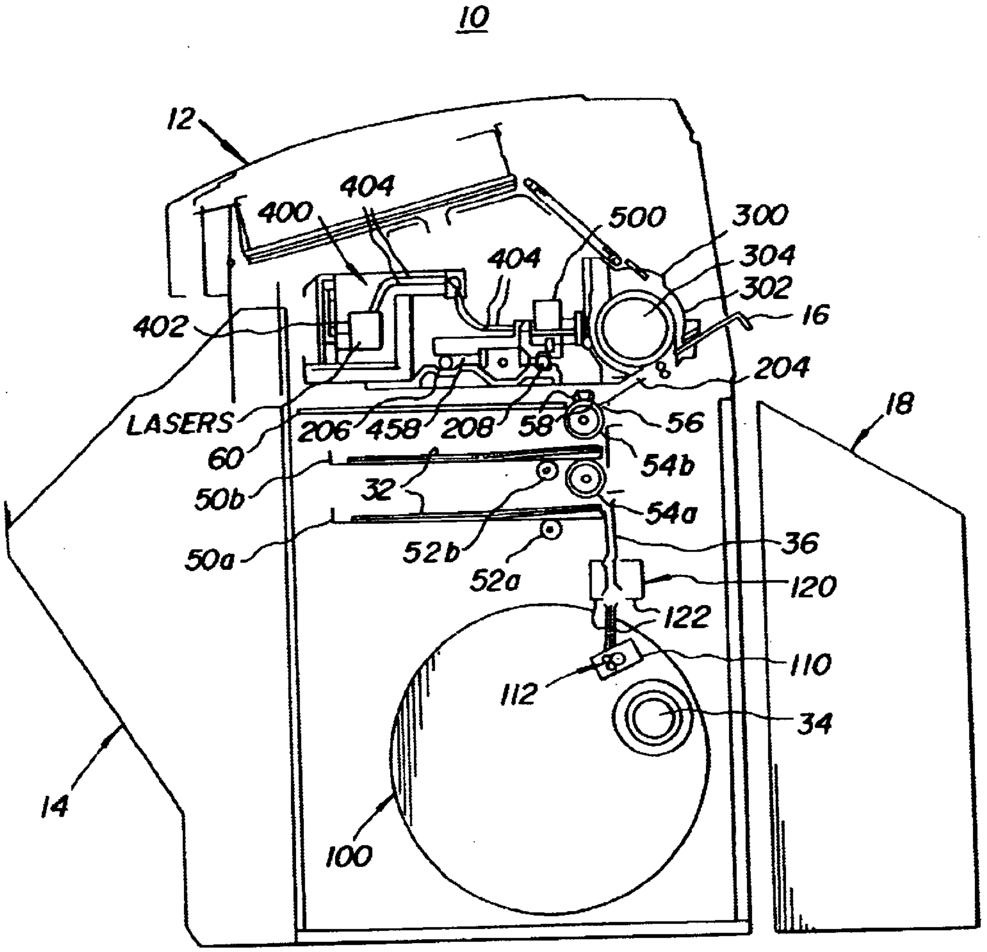
FIG. 1 is a side view in vertical cross-section of an image processing apparatus according to the present invention.

In the following description, like reference characters designate like or corresponding parts throughout the several views. Also, in the following description, it is to be understood that such terms as "front," "rear," "lower," "upper," and the like are words of convenience and are not to be construed as limiting terms. Referring in more detail to the drawings, the invention will now be described.

Turning first to FIG. 1, an image processing apparatus, which is generally referred to as 10, includes an imaging subsystem 458 according to the present invention. The imaging subsystem 458, which includes a linear translation subsystem, has been aligned according to the process of the present invention prior to placement in the image processing apparatus 10.

In regard to the remainder of the image processing apparatus shown in FIG. 1, the image processing apparatus 10 comprises an image processor housing 12, which provides a protective cover for the apparatus. The image processing apparatus 10 also includes a hinged image processor door 14, which is attached to the front portion of the image processor housing 12 and permits access to two material trays 50. A lower material tray 50*a* and upper material tray 50*b* are positioned in the interior portion of the image processor housing 12 for supporting print media 32, or an alternative material, thereon. Only one of the material trays 50 will dispense the print media 32 out of the material tray 50 to create an intended image thereon. The alternate material tray can be used to provide an alternative media, or function as a back-up material tray to support additional print media 32. In this regard, lower material tray 50*a* includes a lower media lift cam 52*a*, which is used to lift the lower material tray 50*a* and, ultimately, the print media 32 upwardly toward lower media roller 54*a* and upper media roller 54*b*. When the media rollers 54*a*, 54*b* are both rotated, the print media 32 is pulled upwardly towards a media guide 56. The upper material tray 50*b* includes an upper media lift cam 52*b* for lifting the upper material tray 50*b* and, ultimately, the print media 32 towards the upper media roller 54*b*, which directs it toward the media guide 56.

Continuing with FIG. 1, the movable media guide 56 directs the print media 32 under a pair of media guide rollers 58. This engages the print media 32 for assisting the upper media roller 54*b* in directing it onto the media-staging tray 60. The media guide 56 is attached and hinged to the lathe bed scanning frame 202 at one end, and is uninhibited at its other end for permitting multiple positioning of the media guide 56. The media guide 56 then rotates the uninhibited end downwardly, as illustrated. The direction of rotation of the upper media roller 54*b* is reversed for moving the print medium receiver material 32, which is resting on the media-staging tray 60, under the pair of media guide rollers 58 upwardly through an entrance passageway 204 and up to the imaging drum 300.

Continuing to refer to FIG. 1, a roll of donor material 34 is connected to the media carousel 100 in a lower portion of the image processor housing 12. Four rolls of donor material 34 of different colors, typically black, yellow, magenta and cyan, are used. A media drive mechanism 110 is attached to each roll of donor material 34, and includes a plurality of media drive rollers 112 through which the donor material 34 is metered upwardly into a media knife assembly 120. After the donor material 34 reaches a predetermined position, the media drive rollers 112 cease driving the donor material 34. Two media knife blades 122 positioned at the bottom portion of the media knife assembly 120 cut the donor material 34 into donor sheet materials 36. The lower media roller 54*a* and the upper media roller 54*b* along with the media guide 56 then pass the donor sheet material 36 onto the media-staging tray 60 and ultimately to the imaging drum 300.

FIG. 1 also shows a rotatable imaging drum 300 and a load roller 350. The imaging drum 300 has a hollowed-out interior portion 304 and a cylindrical-shaped drum housing 302. Once the print medium receiver sheet material 32 is moved into position, the load roller 350 is moved into contact with the print medium receiver sheet material 32 against the imaging drum 300. The load roller 350 removes any entrained air between the media and the imaging drum 300.

The image processing apparatus of FIG. 1 also includes a laser assembly 400 with a quantity of laser diodes 402 in its interior. The laser diodes are connected to fiber optic cables 404, and ultimately to a printhead 500. The fiber optic cables 404 are bundled in a fiber optic tube, or conduit tube 562, one end of which is connected to the printhead 500. In line between the laser assembly 400 and the printhead 500 is a cooler housing, which encloses a filtration system 570 in series with a cooler 566. When the image processing apparatus 10 is in use, cooled, filtered air from the filtration system 570 and the cooler 566 is blown down the conduit tube to the printhead 500. The printhead 500 directs energy received from the laser diodes 402. This causes the donor material 36 to pass the desired color across the gap to the print media 32.

Figure 2:
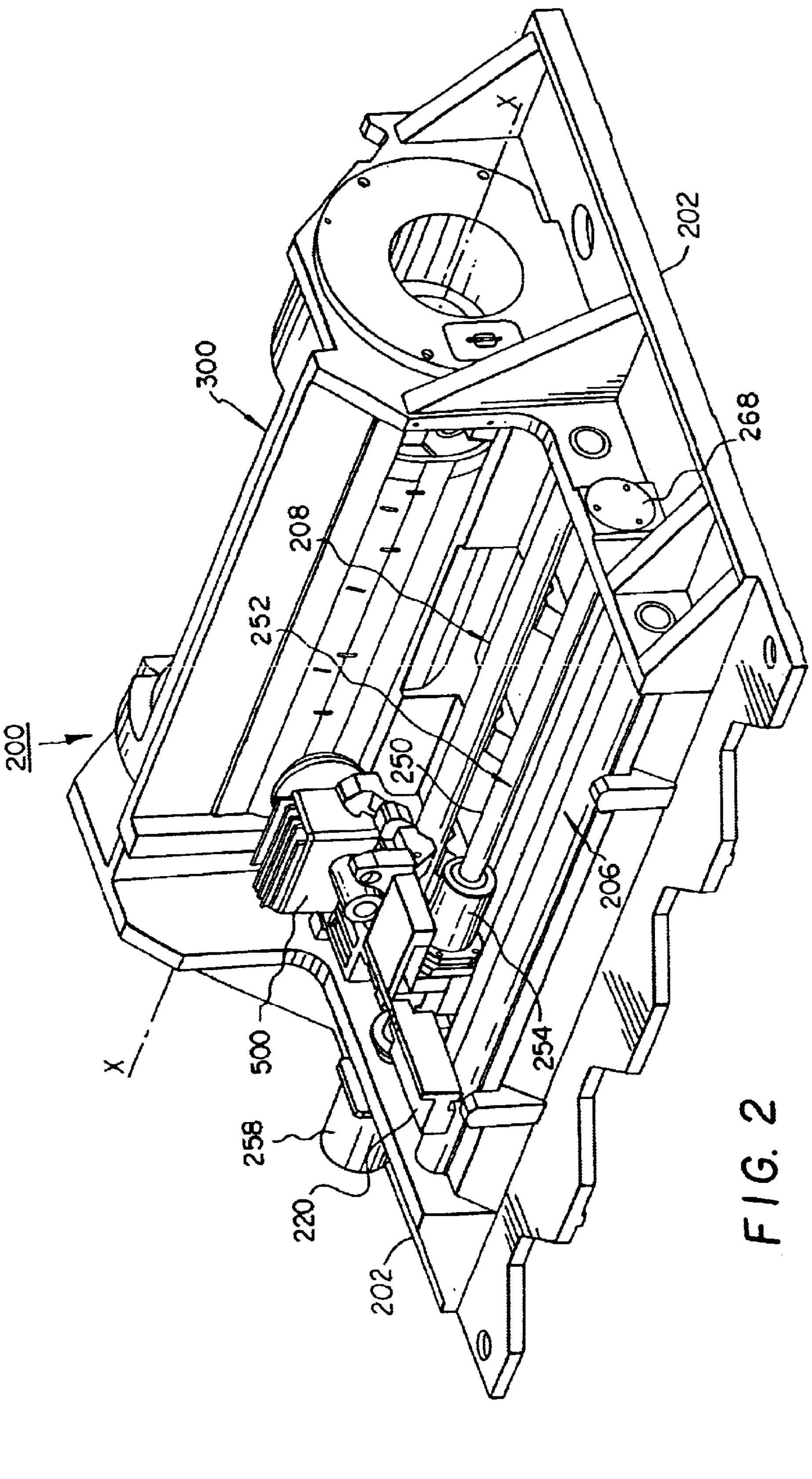
FIG. 2 is a perspective view of an image processing apparatus according to the present invention.

The printhead 500 attaches to a lead screw 250 (see FIG. 2). A lead screw drive nut 254 and drive coupling (not shown) permit axial movement along the longitudinal axis of the imaging drum 300 for transferring the data to create the intended image onto the print media 32.

For writing, the imaging drum 300 rotates at a constant velocity. The printhead 500 begins at one end of the print media 32 and traverses the entire length of the print media 32 for completing the transfer process for the particular donor sheet material 36 resting on the print media 32. After the printhead 500 completes the transfer process for the particular donor material 36 resting on the print media 32, the donor material 36 is removed from the imaging drum 300 and transferred out of the image processor housing 12 via a skive or ejection chute 16. The donor sheet material 36 eventually comes to rest in a waste bin 18 for removal by the user. The above-described process is then repeated for the other rolls of donor material 34.

Continuing with FIG. 1, after the color from the donor sheet materials 36 has been transferred, the donor sheet material 36 is removed from the imaging drum 300. The print media 32 with the intended image thereon is then removed from the imaging drum 300 and transported via a transport mechanism out of the image processor housing 12 and comes to rest against a media stop.

Operation of the image processing apparatus includes transporting print media 32 to the imaging drum 300. It is then secured onto the imaging drum 300. Next, donor material 36 is mounted on the imaging drum 300. A load roller 350 removes entrained air between the imaging drum 300 and the print media. The donor material 36 is superposed on the print media 32 mounted on the imaging drum.

After the donor material is secured to the periphery of the imaging drum 300, the lathe bed scanning subsystem 200 or write engine provides the scanning function. This can be accomplished by retaining the print media 32 and the donor material 36 on the spinning imaging drum 300 while it is rotated past the printhead 500 that will expose the print media 32. The translator drive 258 then traverses the printhead 500 and translation stage member 220 axially along the axis of the imaging drum in coordinated motion with the rotating imaging drum 300. These movements combine to produce the intended image on the print media 32.

Where a media carousel 100 is employed, it is rotated about its axis into the desired position, so that the print media 32 or donor material 34 can be withdrawn, measured, and cut into sheet form of the required length, and then transported to the imaging drum. To accomplish this, the media carousel 100 has a vertical circular plate, preferably with, though not limited to, six material support spindles. The support spindles are arranged to carry one roll of print media, and four rolls of donor material. Each spindle has a feeder assembly to withdraw the print media 32 or donor material 34 from the spindles.

Turning to FIG. 2, the image processing apparatus 10 includes the imaging drum 300, printhead 500, and lead screw 250, which are assembled in the lathe bed scanning frame 202. The imaging drum 300 is mounted for rotation about an axis X in the lathe bed scanning frame 202. The printhead 500 is movable with respect to the imaging drum 300, and is arranged to direct a beam of light to the donor sheet material 36. The beam of light from the printhead 500 for each laser diode 402 (shown in FIG. 1) is modulated individually by modulated electronic signals from the image processing apparatus 10. These are representative of the shape and color of the original image. The color on the donor sheet material 36 is heated to cause volatilization only in those areas in which its presence is required on the print media 32 to reconstruct the shape and color of the original image.

Continuing with FIG. 2, the printhead 500 is mounted on a movable translation stage member 220, which is supported for low friction movement on translation-bearing rods 206, 208. The linear translation subsystem 210 includes the translation stage member 220, the translation-bearing rods 206, 208, and the translator drive 258. The translation-bearing rods 206, 208 are sufficiently rigid so as not sag or distort between mounting points and are arranged as parallel as possible with the axis X of the imaging drum 300, with the axis of the printhead 500 perpendicular to the axis X of the imaging drum 300 axis. The front translation-bearing rod 208 locates the translation stage member 220 in the vertical and the horizontal directions with respect to axis X of the imaging drum 300. The rear translation-bearing rod 206 locates the translation stage member 220 only with respect to rotation of the translation stage member 220 about the front translation-bearing rod 208. This is done so that there is no over-constraint of the translation stage member 220, which might cause it to bind, chatter, or otherwise impart undesirable vibration or jitters to the printhead 500 during the generation of an intended image. The translator drive 258 traverses the translation stage member and printhead axially along the imaging drum.

Figure 3:
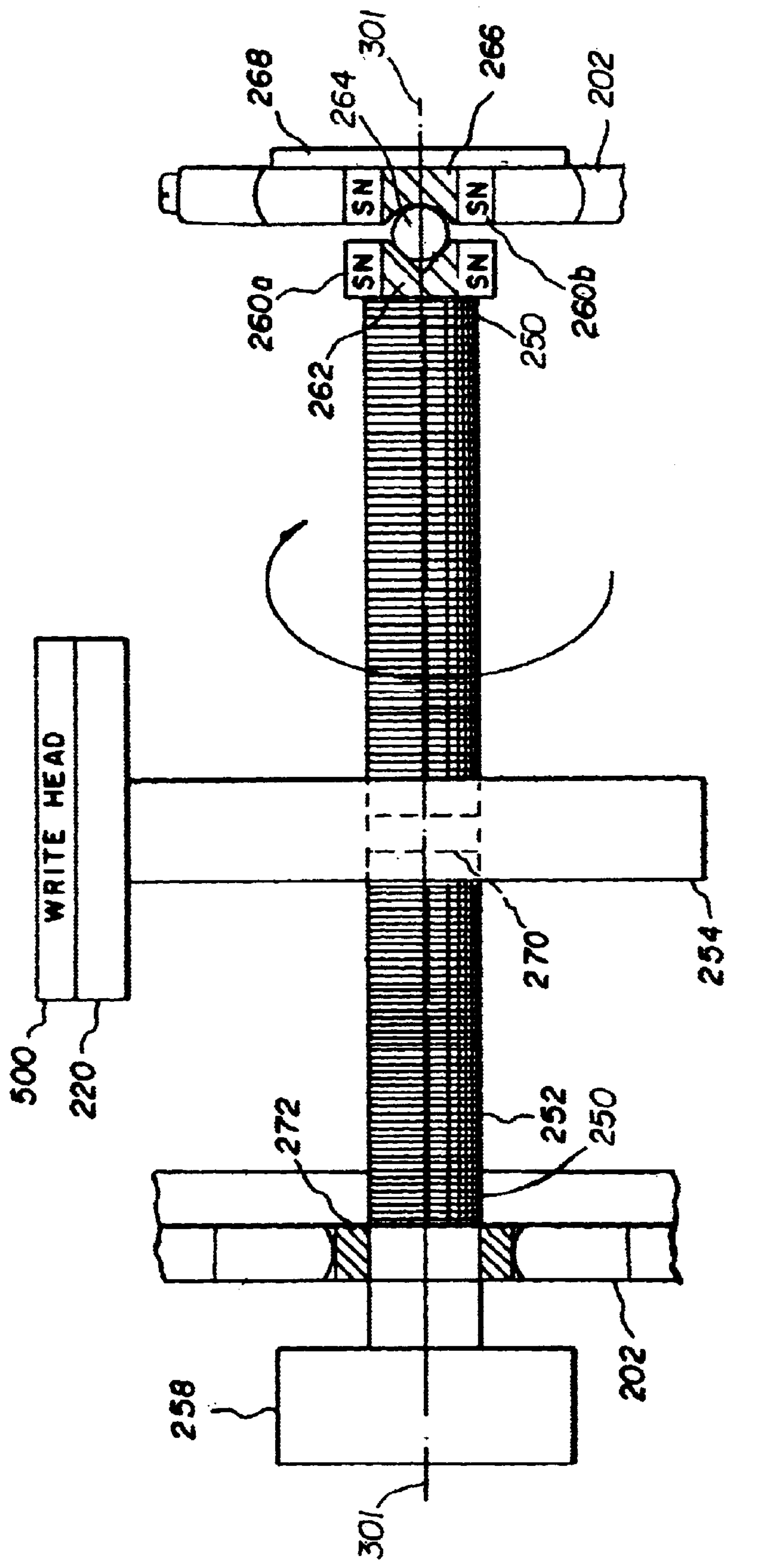
FIG. 3 is a top view in horizontal cross section, partially in phantom, of a lead screw according to the present invention.

Referring to FIGS. 2 and 3, the lead screw 250 includes an elongated, threaded shaft 252, which is attached to the translator linear drive motor 258 on its drive end and to the lathe bed scanning frame 202 by means of a radial bearing 272. A lead screw drive nut 254 includes grooves in its hollowed-out center portion 270 for mating with the threads of the threaded shaft 252. This allows the lead screw drive nut 254 axial movement along the threaded shaft 252 as the threaded shaft 252 is rotated by the linear drive motor 258. The lead screw drive nut 254 is integrally attached to the printhead 500 through the lead screw coupling (not shown) and the translation stage member 220 at its periphery, so that the threaded shaft 252 is rotated by the linear drive motor 258. This moves the lead screw drive nut 254 axially along the threaded shaft 252, which in turn moves the translation stage member 220, and ultimately the printhead 500 axially along the imaging drum 300.

As illustrated in FIG. 3, an annular-shaped axial load magnet 260*a* is integrally attached to the driven end of the threaded shaft 252, and is in a spaced-apart relationship with another annular-shaped axial load magnet 260*b* attached to the lathe bed scanning frame 202. The axial load magnets 260*a* and 260*b* are preferably made of rare-earth materials such as neodymium-iron-boron. A generally circular-shaped boss 262 part of the threaded shaft 252 rests in the hollowed-out portion of the annular-shaped axial load magnet 260*a*, and includes a generally V-shaped surface at the end for receiving a ball bearing 264. A circular-shaped insert 266 is placed in the hollowed-out portion of the other annular-shaped axial load magnet 260*b*. It has an arcuate-shaped surface at one end for receiving ball bearing 264, and a flat surface at its other end for receiving an end cap 268 placed over the annular-shaped axial load magnet 260*b*, which is attached to the lathe bed-scanning frame 202 for protectively covering the annular-shaped axial load magnet 260*b*. This provides an axial stop for the lead screw 250.

Continuing with FIG. 3, the linear drive motor 258 is energized and imparts rotation to the lead screw 250, as indicated by the arrows. This causes the lead screw drive nut 254 to move axially along the threaded shaft 252. The annular-shaped axial load magnets 260*a*, 260*b* are magnetically attracted to each other, which prevents axial movement of the lead screw 250. The ball bearing 264, however, permits rotation of the lead screw 250 while maintaining the positional relationship of the annular-shaped axial load magnets 260, i.e., slightly spaced apart. Mechanical friction between them is thus prevented, yet the threaded shaft 252 can continue to rotate.

The printhead 500 travels in a path along the drum 300, moving at a speed synchronous with the drum 300 rotation and proportional to the width of the writing swath. The pattern transferred by the printhead 500 to the print media 32 along the imaging drum 300 is a helix.

In operation, the scanning subsystem 200 or write engine contains the mechanisms that provide the mechanical actuations for the imaging drum positioning and motion control to facilitate placement of loading onto, and removal of the print media 32 and the donor sheet material 36 from the imaging drum 300. The scanning subsystem 200 or write engine provides the scanning function by retaining the print media 32 and donor sheet material 36 on the rotating imaging drum 300. This generates a once per revolution timing signal to the data path electronics as a clock signal, while the translator drive 258 traverses the translation stage member 220 and printhead 500 axially along the imaging drum 300 in a coordinated motion with the imaging drum rotating past the printhead. Positional accuracy is maintained in order to control the placement of each pixel, so that the intended image produced on the print media is precise.

During operation of this preferred embodiment of an image processing apparatus, the lathe bed scanning frame 202 supports the imaging drum and its rotational drive. The translation stage member 220 and write head are supported by the two translation-bearing rods 206, 208 that are positioned parallel to the imaging drum and lead screw. They are parallel to each other and form a plane therein, along with the imaging drum and lead screw. The translation-bearing rods are, in turn, supported by the outside walls of the lathe bed scanning frame of the lathe bed scanning subsystem or write engine. The translation-bearing rods are positioned and aligned therebetween.

The translation drive 258 is for permitting relative movement of the printhead 500 by means of a DC servomotor and encoder, which rotates the lead screw 250 parallel with the axis of the imaging drum 300. The printhead 500 is placed on the translation stage member 220 in the "V" shaped grooves. The "V" shaped grooves are in precise relationship to the bearings for the front translation stage member 220 supported by the front and rear translation-bearing rods 206, 208. The translation-bearing rods are positioned parallel to the imaging drum 300. The printhead is selectively locatable with respect to the translation stage member; thus it is positioned with respect to the imaging drum surface. The printhead has a means of adjusting the distance between the printhead and the imaging drum surface, and the angular position of the printhead about its axis using adjustment screws. An extension spring provides a load against these two adjustment means.

The translation stage member 220 and printhead 500 are attached to the rotational lead screw 250, which has a threaded shaft, by a drive nut and coupling. The coupling is arranged to accommodate misalignment of the drive nut and lead screw so that only forces parallel to the linear lead screw and rotational forces are imparted to the translation stage member by the lead screw and drive nut. The lead screw rests between two sides of the lathe bed scanning frame 202, where it is supported by deep groove radial bearings. At the drive end, the lead screw 250 continues through the deep groove radial bearing through a pair of spring retainers. The spring retainers are separated and loaded by a compression spring, and to a DC servomotor and encoder. The DC servomotor induces rotation to the lead screw 250, which moves the translation stage member 220 and printhead 500 along the threaded shaft as the lead screw 250 is rotated. Lateral movement of the printhead 500 is controlled by switching the direction of rotation of the DC servomotor and thus the lead screw 250.

The printhead 500 includes a number of laser diodes 402, which are tied to the printhead and can be individually modulated to supply energy to selected areas of the print media 32 in accordance with an information signal. The printhead 500 of the image processing apparatus 10 includes a plurality of optical fibers, which are coupled to the laser diodes 402 at one end and at the opposite end to a fiber optic array within the printhead. The printhead 500 is movable relative to the longitudinal axis of the imaging drum 300. The colorant is transferred to the print media 32 as radiation is transferred from the laser diodes by the optical fibers to the printhead, and thus to the donor sheet material 36, and is converted to energy in the donor sheet material.

Figure 4:
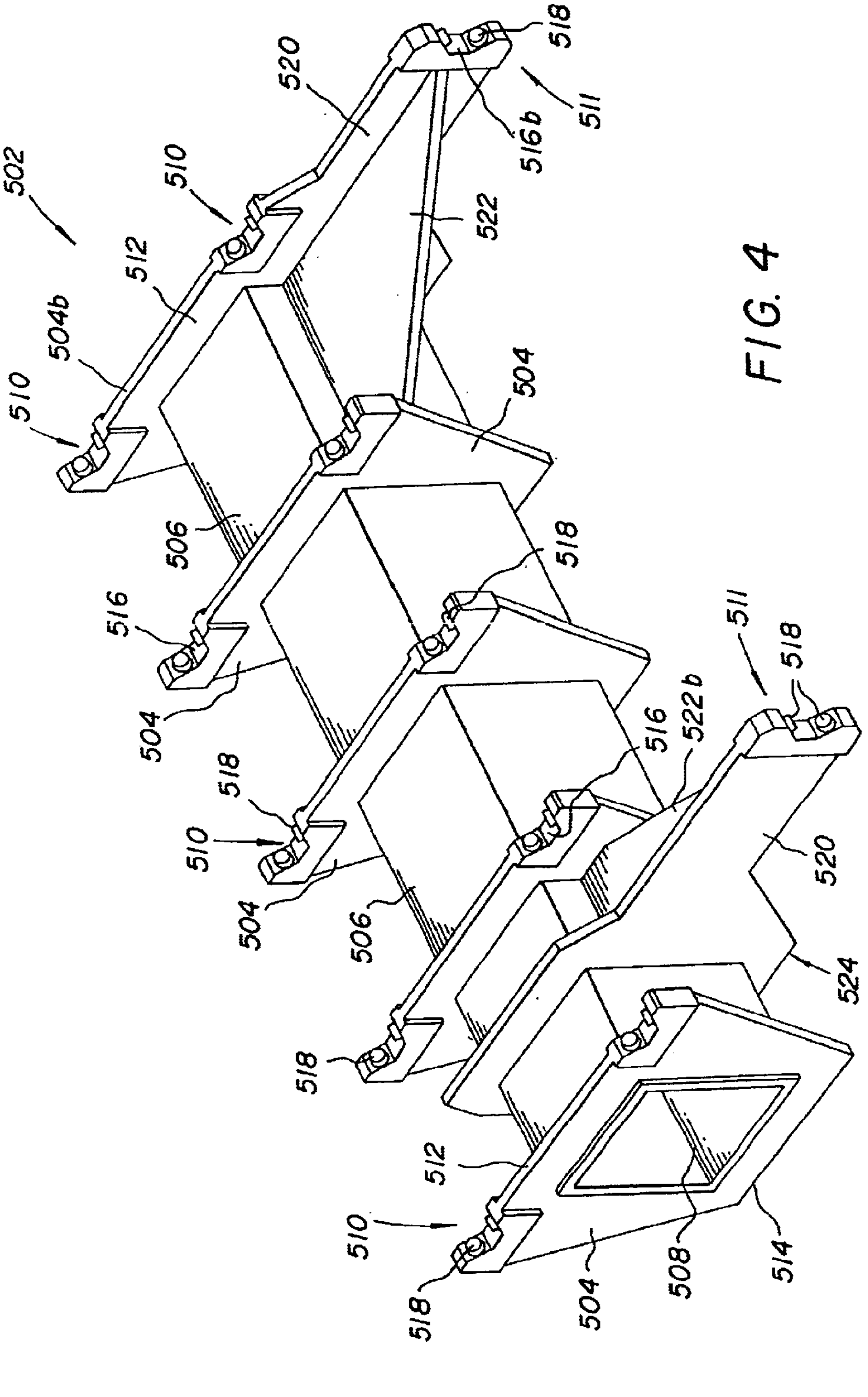
FIG. 4 is a perspective view of a set apparatus according to the present invention.

Turning to FIG. 4, the present alignment system for the magnetic alignment of an imaging subsystem of an image processing apparatus 10 includes a set apparatus 502. The set apparatus 502 sits on top of a master alignment fixture 534. In FIG. 4, the set apparatus 502 is shown in an inverted position in order to illustrate matching first set arms 510. The master alignment fixture 534 and the set apparatus 502 make up the alignment system of the present invention. An imaging subsystem 458 is magnetically aligned an using the alignment system in order to improve over-all performance of the image processing apparatus holding the imaging subsystem, including compensation for any bowing in the translation-bearing rods of the imaging subsystem. Suitable image processing apparatus may include, but are not limited to, printing presses, printers, and scanners.

Continuing with FIG. 4, the set apparatus includes:

a) a tube 506 or rod;

b) a plurality of aligned first set arms 510 extending in a downward direction from the tube 506 or rod, a magnet 518 being attached to each leg of the first set arm 510, the first set arms 510 being above and in close proximity to the translation-bearing rods 206, 208 when the set apparatus 502 is on the master alignment fixture 534, the magnets 518 of the first set arms 510 being detachably attachable to the translation-bearing rod; and c) at least two second, extended arms 511 projecting from a side of the tube 506 or rod, the second, extended arms 511 being detachably attachable to the drum axis tool 526 or drum 300.

As depicted in FIG. 4, the first set arms 510 of the set apparatus 502, which are preferably generally V-shaped, are each affixed to two corners of a lower end 512 of an arm plate 504. The base 516 of the V-shaped arm 510 may be pointed, but is preferably flattened, as shown in FIG. 4.

As illustrated in FIG. 4, a magnet 518 is loosely attached on its lower surface to an inside face of a leg of the first, V-shaped arm 510 of the set apparatus 502. Each V-shaped first set arm 510 holds one magnet 518. Two set magnets 518 are shown on the two legs of each V-shaped first set arm 510 in FIG. 4. The set magnets 518 are preferably circular in shape and identical to one another, as shown, with a diameter slightly less than the diameter of one leg of the V-shaped first set arm 510. The distance from one set magnet 518 to the opposite set magnet 518 on a V-shaped first set arm 510 is only slightly more than the diameter of a standard sized translation-bearing rod, so the translation-bearing rod is closely received in each V-shaped first set arm. The V-shaped first set arms 510 within a set apparatus 502 are preferably all identical to one another and are formed to receive a translation-bearing rod. The V-shaped first set arms 510 along each side of the set apparatus 502 are aligned with one another in order to receive a translation-bearing rod in each row of arms.

Once they are brought into proximity, the set magnets 518 are attracted to, and attach to, the translation-bearing rods 206, 208. The set magnets 518 remain attracted to the translation-bearing rods 206, 208 until the two are detached from one another, as by physical force or interruption of the magnetic attraction. Since the lower ends 512 of the arm plates 504 are longer than the upper ends 514, the translation-bearing rods 206, 208 are held parallel to one another to the lower right and left of the torque tube 506. Any cylindrical structure or rod may be utilized herein in place of a torque tube 506.

Figure 5:
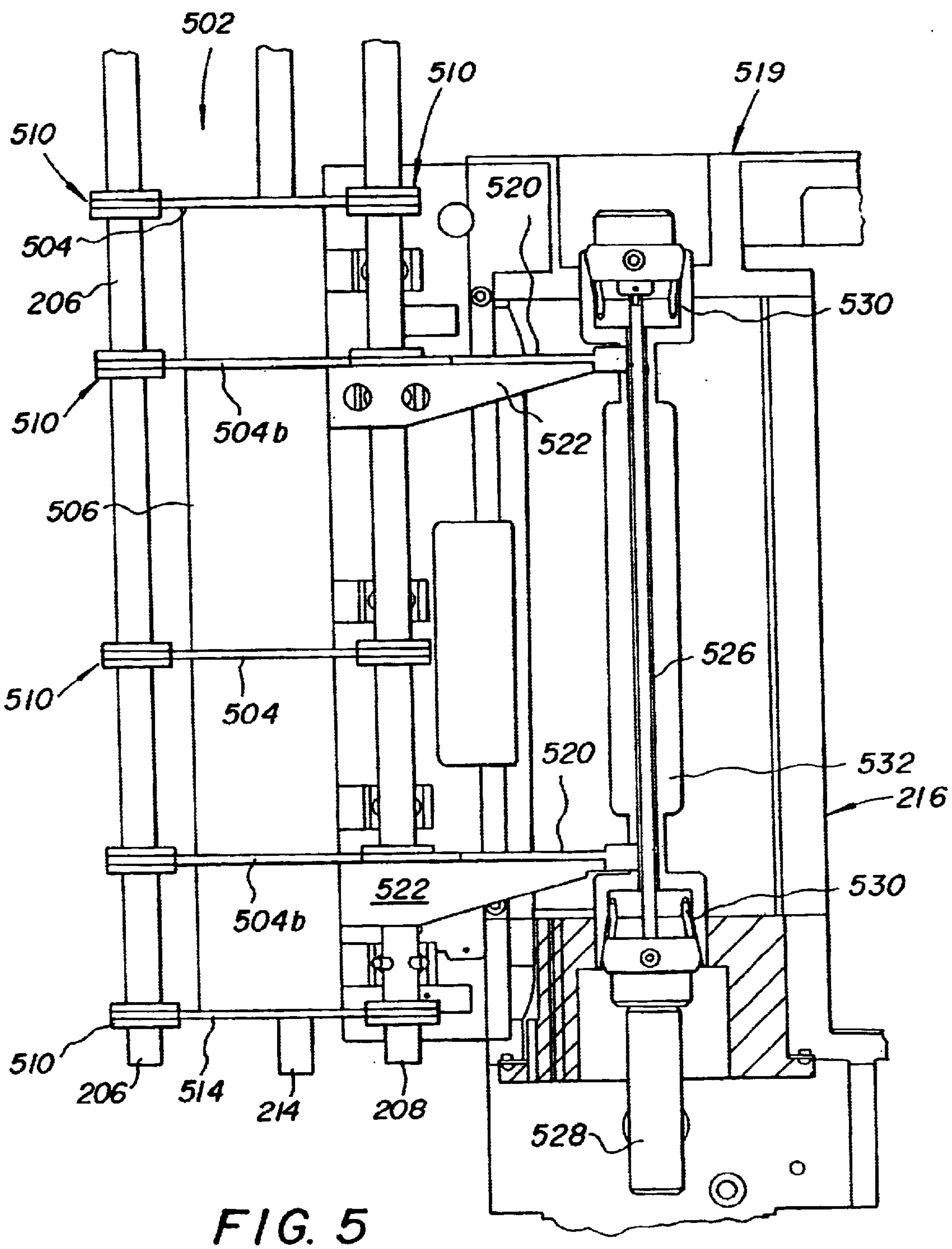
FIG. 5 is a top plan view of a set apparatus according to the present invention, shown in place.

Referring to FIGS. 4 and 5, at least one of the arm plates **504*b* of the set apparatus 502 extends outward to the left or right of the torque tube 506. This extended arm plate 504*b* ends in a V-shaped second, extended set arm 511 for removable attachment to the drum axis tool 526, once the set apparatus is placed in the master alignment fixture, as shown in FIG. 5. Thus, an extended arm plate 504*b* has three V-shaped second arms, two on its lower end 512 for attachment to the translation-bearing rods 206, 208, and one at the far end of its extension 520 for attachment to the drum axis tool 526 (see FIG. 5). The arm extension 520 may be supported by an elbow 522 between it and the tube 506, as shown in FIG. 4**.

In addition, the set apparatus 502 may include a specialized extension arm plate 524, such as the one shown at the left of FIG. 4, which has only the V-shaped second arm 511 at the end of its extension 520. The extension arm plate 524 also has a central cut-out so that it closely fits over the torque tube 506 parallel to the arm plates 504. The extension arm plate 524 may be supported by an elbow **522*b* between it and the tube 506, as shown in FIG. 4. The extensions 520 of the arm plate 504*b* and the extension arm plate 524 are the same length as one other, and the extension V-shaped second arms 511 are aligned with one another, in order to receive the straight drum axis. Like the first, V-shaped set arms 510, the extension V-shaped second arms 511 have a flattened base 516*b*, and magnets 518 attached to the legs of the second set arms 511**.

Figure 6:
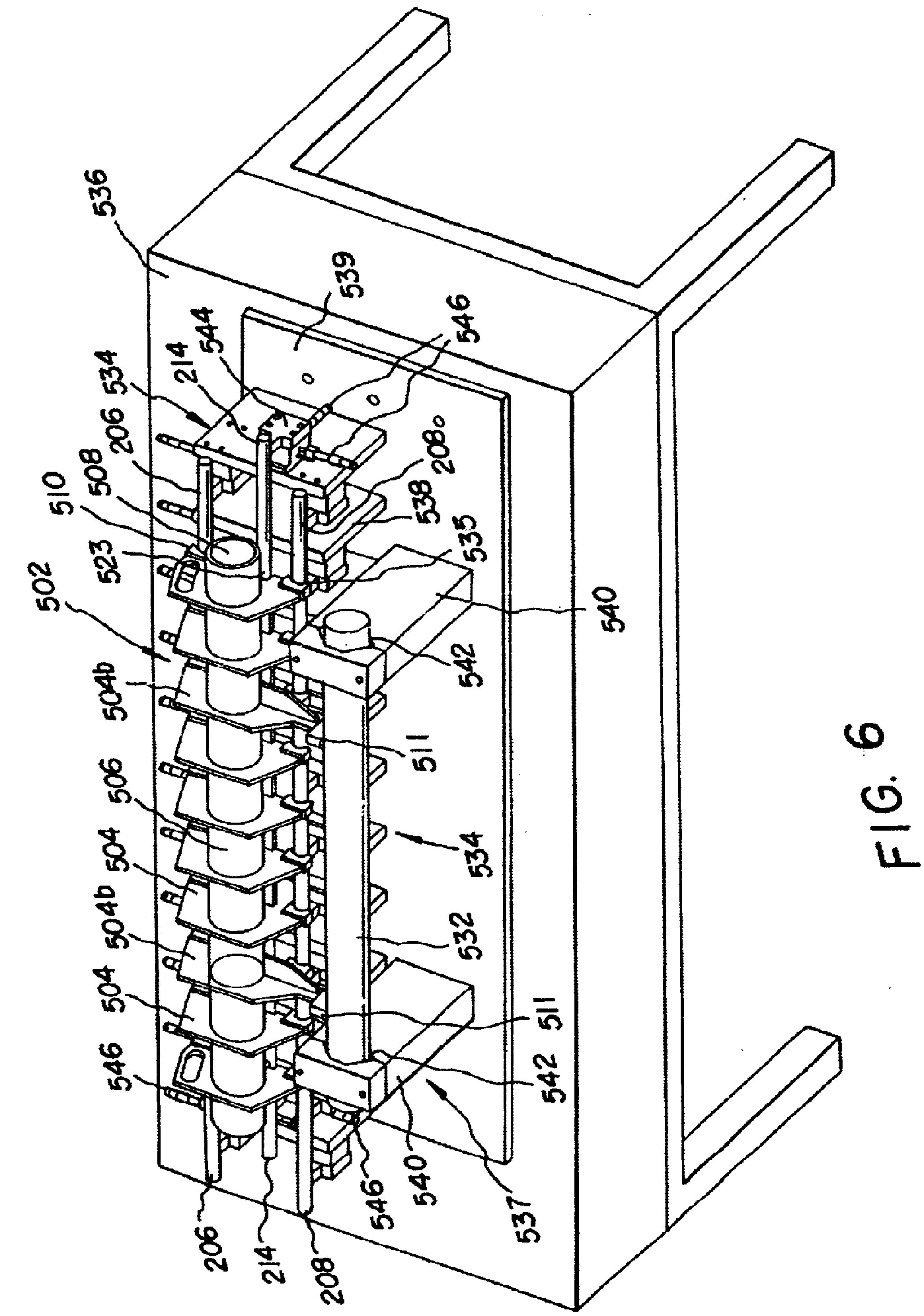
FIG. 6 is a perspective view of a set apparatus and a master alignment fixture according to the present invention.

The master alignment fixture 534, which is shown in FIGS. 5 and 6, comprises the following:

a) the two like, magnet-attracting translation-bearing rods 206, 208;

b) the drum axis tool 526 or drum 300;

c) a means 535 for supporting the translation-bearing rods 206, 208 in a parallel, planar relationship to one another;

d) a means 540 for supporting the drum axis tool 526 or drum adjacent and in a parallel relationship to the translation-bearing rods 206, 208; and e) a means 546 for measuring and aligning the translation-bearing rods 206, 208 in relation to the parallel drum axis tool 526 or drum.

Once the translation-bearing rods 206, 208 and drum axis tool 526, and optionally the lead screw tool rod 214, are in place in the master alignment fixture 534, the set apparatus 502 is ready for placement on the master alignment fixture 534. The set apparatus 502 can be placed on the master alignment fixture 534 quite easily and rapidly. The magnets 518 on the V-shaped first set arms 510 are then in proximity to, and magnetically attracted to, the translation-bearing rods 206, 208. The set magnets 518 serve the function of holding the translation-bearing rods 206, 208 solidly in place without interfering with or damaging the translation-bearing rods. The V-shaped first set arms 510 facilitate coupling with the translation-bearing rod. Tool rods used to set the magnetic V-shaped first set arms 510 are replaceable. The master alignment fixture 534 is reusable and is capable of aligning a series of set apparatus, one after another, for many years.

An actual drum may be utilized in place of the drum axis tool 526. In that case, the arms of the set apparatus are larger than the V-shaped first set arms 510 shown in FIGS. 4–10, in order for the magnets 518 to be in close proximity to the drum 300.

FIG. 5 provides a top view of a set apparatus 502 on a printing press 519. The translation-bearing rods 206, 208 are contacted by the magnets 518 on the V-shaped arms 510, which are shown from the top in FIG. 5, of the set apparatus 502. The upper ends 514 of five parallel arm plates 504 are also shown in FIG. 5. The longitudinal axis of the tube 506 is generally perpendicular to the longitudinal axis of each of the arm plates 504. Each arm plate 504 has two, matching, V-shaped first set arms 510 at each lower comer. The translation-bearing rods 206, 208 are parallel to, and slightly lower than, the torque tube 506. The V-shaped first set arms 510 along each side of the tube 506 are aligned, in order to support a translation-bearing rod 206 or 208. As shown in FIG. 4, each V-shaped first set arm 510 carries two set magnets 518, which contact the translation-bearing rod.

Four parallel shafts are shown in FIG. 5: the two translation-bearing rods 206, 208, the torque tube 506 above the lead screw, and a drum axis tool 526 to the right of the others. The longitudinal axes of each of these shafts are aligned. Also, a tool rod 214 for a lead screw extends between and parallel to the translation-bearing rods 206, 208. Opposite ends of the drum screw 526 are set in casting bores. One end of the drum screw 526 is attached to a rotatable handle 528. The rotatable handle 528 locks up the drum screw in the casting bores. A cinch collet 530 at either end of the drum screw 526 cinches up the screw. The drum screw 526, which is essentially a threaded shaft, is enclosed in a cylindrical drum screw axis 532. The drum screw axis 532 is made of a material that is magnet-attractive. The drum screw 526, drum screw axis 532, cinch collet 530, and handle 528 together comprise a drum axis tool 216, which simulates a drum axis for purposes of alignment. A simple rod could be used herein instead of the drum axis tool 216. The handle 528 is hard mounted to the drum screw 526, and interfaces with the cinch collet 530. Screw threads in the cinch mate with the threads on either end of the drum screw 526. When the handle 528 is rotated, the parts move axially and tighten up the cinch collet 530, moving toward or away from the center of the drum axis tool 216 at the same time.

In FIG. 5, the drum housing 302 is supported at either end by the two V-shaped second set arms 511 on the plate extensions 520 extending from the arm plates 504*b*. The extensions 520 are supported by the elbows 522, which have one leg of the right angle adjacent to the extension 520, with the adjacent leg of the right angle supported by the tube 506. In this preferred embodiment, the rear translation-bearing rod 206 is contacted by a row of magnets 518 on the V-shaped first arms 510 to the left of the tube 506, and the front translation-bearing rod 208 is contacted by a row of magnets 518 on the V-shaped first set arms 510, which is shown to the right of the tube 506 nearest to the drum axis tool 526.

Turning to FIG. 6, a set apparatus 502 is shown in place on a master alignment fixture 534. The alignment system is supported on a table 536. The V-shaped first arms 510 of the set apparatus 502 detachably contact the two translation-bearing rods 206, 208. A lead screw tool rod 214 extends below and parallel to the torque tube 506. This set apparatus includes a set of pairs of third arms 523, which also include a magnet 518 on each leg of each third arm, between the rows of first set arms 510, for contacting the lead screw tool rod 214. The lead screw tool rod 214 is parallel to the translation-bearing rods 206, 208, which flank it. The translation-bearing rods 206, 208 are part of the master alignment fixture. The V-shaped first arms 510 with their magnets 518 are most preferably spaced about four or five inches apart from one another. The set apparatus 502 preferably comprises between about four and eight of the first set arms 510, which are generally V-shaped with a flattened base, with one of the set magnets 518 being attached to each leg of each of the first set arms 510.

A preferred system and process for aligning an imaging subsystem according to the present invention preferably only employs one master alignment fixture 534, which costs more to manufacture, and many more set apparatus 502, which are smaller, less complicated, and less expensive. The set apparatus 502 is insertable in the desired image processing apparatus 10. A process according to the present invention includes the steps of: (a) placing the translation-bearing rods 206, 208 and drum axis tool 526, and preferably the lead screw tool rod 214, in the master alignment fixture 534; (b) placing the set apparatus 502 on the master alignment fixture 534, so that the magnets contact the rods 206, 208 and tools 526, 214; (c) aligning the translation-bearing rods 206, 208 in relation to the drum axis tool 526, and preferably the lead screw tool rod 214, preferably using micrometers 546 on the master alignment fixture 534; and (d) fixing the set magnet 518 settings. The set apparatus 502 can then be taken to the particular image processing apparatus 10, and placed in the imaging subsystem of the image processing apparatus. The set apparatus of the present invention can be used in a printer, scanner, printing press, or in any image processing/forming apparatus that employs linear translation, such as in the semiconductor industry, where components are being moved in a linear direction.

As shown in FIG. 6, the master alignment fixture 534 further comprises a base 537 for supporting the remainder of the master alignment fixture, the translation-bearing rod support means and the drum support means being mounted on the base. As shown in FIG. 6, the master alignment fixture 534 also holds the lead screw tool rod 214 between the translation-bearing rods 206, 208, and a means for supporting the lead screw tool rod. Micrometers 546 measure and align the translation-bearing rods in relation to the lead screw tool rod 214, and the parallel drum axis tool 526 or drum. As seen in FIG. 6, the base 537 further comprises a base plate 539, the parallel fixture blocks 538 being mounted in a row on the base plate 539. In this preferred embodiment, the means for supporting the drum axis tool is two spaced apart, parallel drum columns 540 mounted on the base plate 539 adjacent to the fixture blocks 538.

Preferably, the translation-bearing rod support means is a plurality of blocks or parallel master fixture arms 535, which are supported by the base 537. Each master fixture arm 535 extends in an upward direction from a fixture block 538. The master fixture arms 535 form two rows beneath the translation-bearing rods 206, 208. Each translation-bearing rod is received by a row of the master fixture arms. Preferably, each of the first set arms 510 corresponds to one of the master fixture arms 535 beneath it when the set apparatus 502 is on the master alignment fixture 534. When the set apparatus is on the master alignment fixture, the first set arms 510 preferably form rows above the master fixture arms. The lower end of each first set arm 510 may rest on the upper end of the corresponding master fixture arm 535. The master fixture arms 535 are preferably V-shaped or U-shaped, and cushioning pads 552, 552*b* are attached to the inside surface of legs of the master fixture arms.

As shown in FIG. 6, the master alignment fixture 534 comprises a number of the parallel, aligned fixture blocks 538 that extend beneath the set apparatus 502. The master alignment fixture 534 also includes a straight drum screw axis 532, which is set up on the drum columns 540. The opposite ends of the drum axis tool are set into end bores 542 in the drum columns 540 at opposite ends of the drum axis tool. Two end plates 544 on the two opposite end blocks 538 attach to the translation-bearing rods 206, 208. These end plates 544 set the orientation of the front and rear translation-bearing rods 206, 208 with respect to the longitudinal axis of the drum screw axis 532. A plurality of the micrometers 546 extend from the end plates 544 and the fixture blocks 538. The micrometers 546 measure the various distances, e.g., between the translation-bearing rods 206, 208 and the drum axis tool 526.

Continuing with FIG. 6, the two translation-bearing rods 206, 208, and the lead screw tool rod 214 are hard mounted to the master alignment fixture 534 under the set apparatus 502. The micrometers 546 are used to measure and align the master alignment fixture 534. The two translation-bearing rods 206, 208, and the lead screw tool rod 214 are moved relative to the drum screw axis 532. The magnets 518 on the set apparatus 502 are loosely installed. When the set apparatus 502 is placed on the master alignment fixture 534, the set magnets 518 attach themselves to the translation-bearing rods 206, 208, the lead screw tool rod 214, and the drum axis tool 526, which are parts of the master alignment fixture 534. The magnets 518 are then fixed in place in the set apparatus 502, and the set apparatus is removed. The set magnets 518 of the set apparatus 502, as shown in FIG. 4, now duplicate, or mirror, the relationship of the various rods/tools in the master alignment fixture 534. The set apparatus 502 can then be used to align an imaging subsystem. One master alignment fixture 534 can be used to set multiple set apparatus 502, as required to meet production needs, etc.

Figure 7A:
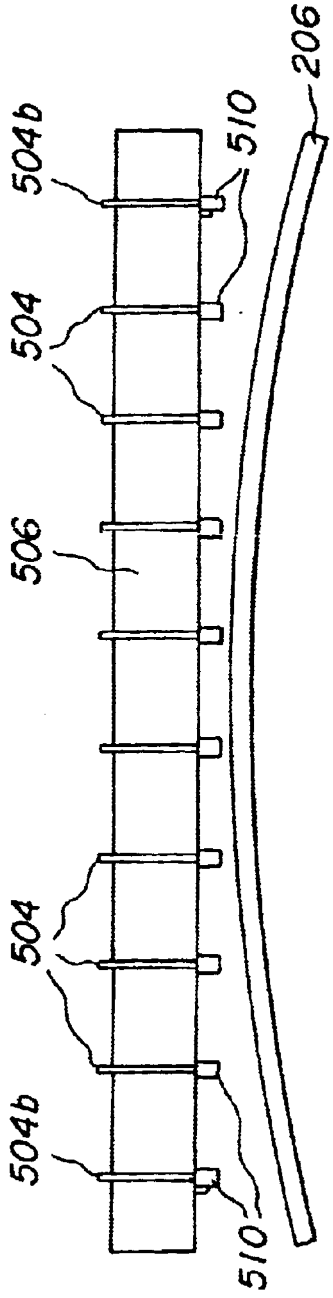
FIGS. 7A and B are schematic views of a portion of a set apparatus and a translation-bearing rod according to the present invention, shown before and after alignment.
Figure 7B:
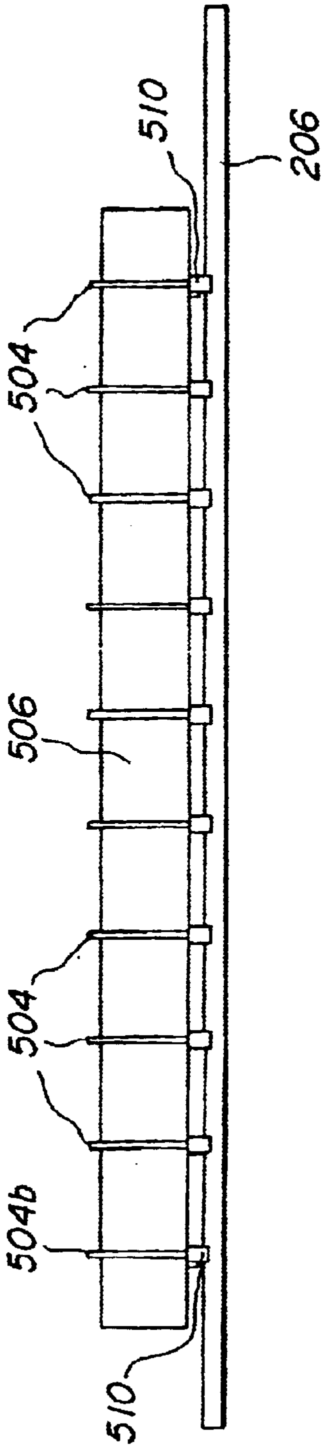

Referring to FIGS. 7A and 7B, a schematic view of a bowed translation-bearing rod 206 or 208 and a portion of a set apparatus 502 prior to the process of the present invention is depicted in FIG. 7A. FIG. 7B shows the portion of the set apparatus 502 and the aligned translation-bearing rod 206 or 208 after the present process. In both figures, a number of arm plates 504 surround the torque tube 506 of the set apparatus 502. V-shaped first set arms 510, which hold magnets 518, are shown (as stylized square shapes) at the bottom of each arm plate 504. In FIG. 7A, the set magnets are shown above but not attached to the bowed translation-bearing rod 206 or 208. In FIG. 7B, the set magnets 518 on the V-shaped first arms 510 in the set apparatus 502 are attached to the aligned translation-bearing rod 206 or 208.

Figure 8:
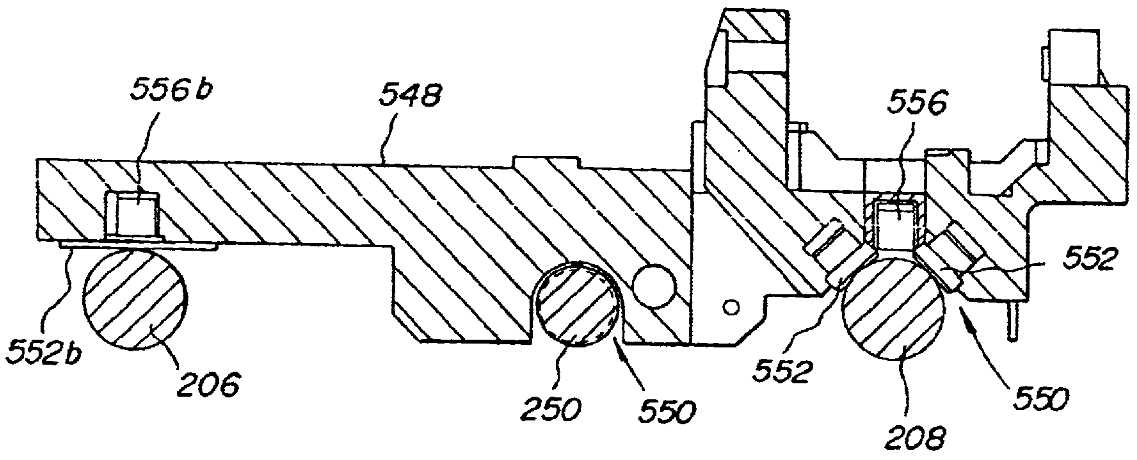
FIG. 8 is a schematic view of a translation stage on a printing press according to the present invention, showing translation-bearing rods.
Figure 9:
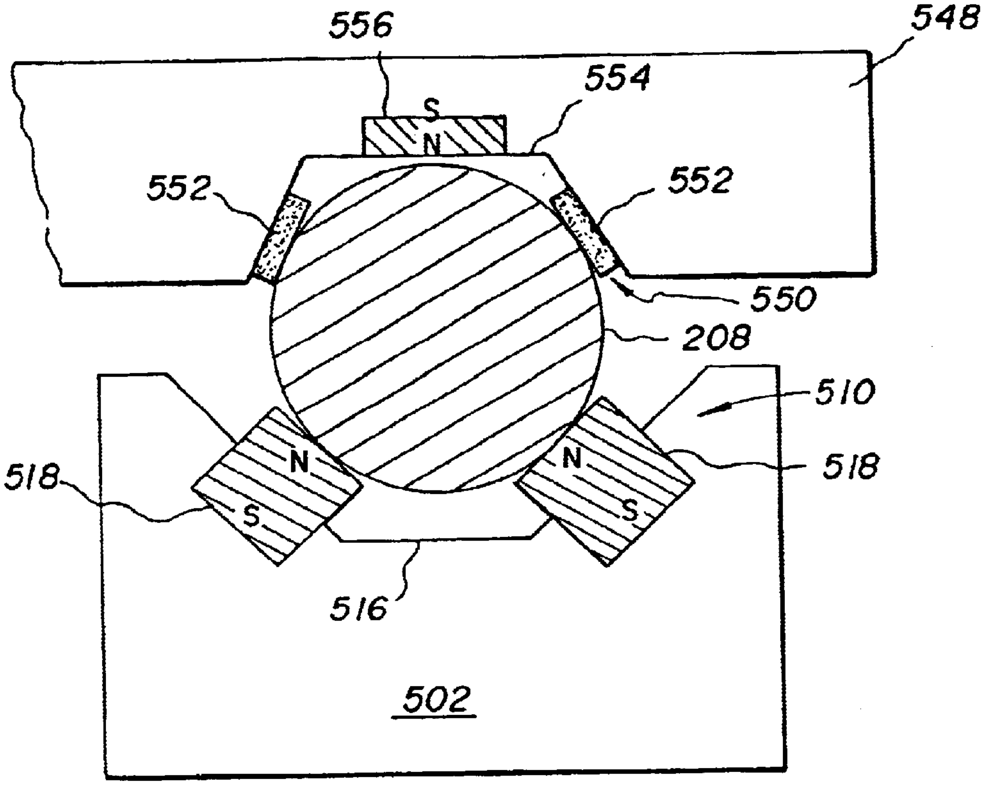
FIG. 9 is a schematic view in vertical cross-section of portions of a translation stage and a set apparatus according to the present invention.
Figure 10:
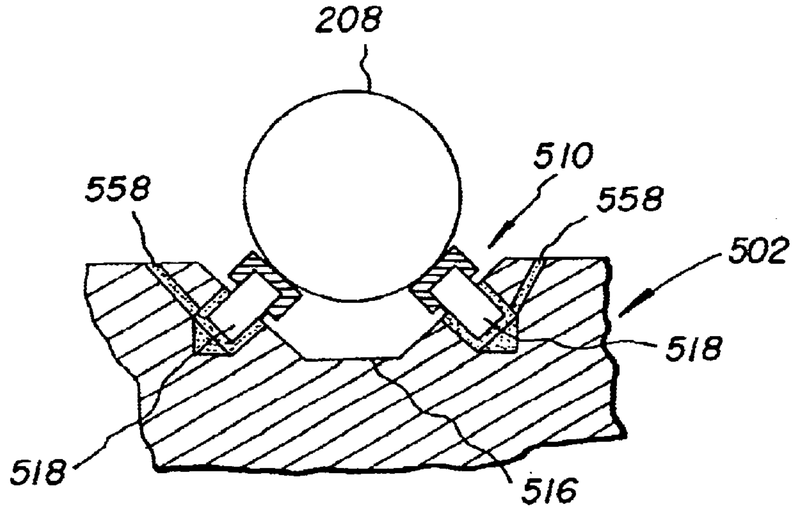
FIG. 10 is a schematic view in vertical cross-section of a translation-bearing rod above a set apparatus according to the present invention.

Turning to FIGS. 8 through 10, the FIG. 8 cross-section, which is taken across a translation stage 548 on a printing press 519, shows translation-bearing rods 206, 208 in place below the translation stage. A lead screw 250 fits into a fourth arm 550 between the translation-bearing rods 206, 208.

As shown in FIGS. 9 and 10, the upper portion of the translation-bearing rod 208 is received in the fourth arm 550, which is preferably generally V-shaped, in the translation stage 548. A lower surface of each of two disc-shaped plastic bearing pads 552 is attached to each leg of the fourth arm 550 for protecting the rod surfaces. The opposite surfaces of the two bearing pads 552 ride on the translation-bearing rod 208.

As shown in FIG. 9, the base 554 of the fourth arm 550 is also flattened. Embedded in the base 554 is a stage load magnet 556. As indicated in FIG. 9, the North end of the stage load magnet 556 faces the front translation-bearing rod 208, and the South end of the magnet 556 is embedded in the base 554 of the fourth arm 550. The stage load magnet 556 is magnetically attracted to the front translation-bearing rod 208, without actually contacting the translation-bearing rod 208.

As illustrated in FIG. 8, the rear translation-bearing rod 206 is attracted to a second stage load magnet **556*b*, with its South end embedded in the translation stage 548. A second bearing pad 552*b* is shown between the second stage load magnet 556*b* and the rear translation-bearing rod 206. The second stage load magnet 556*b* also attracts, but does not contact, the surface of the rear translation-bearing rod 206**.

FIG. 9 illustrates a cross-section taken across a translation table in a printing press 519 with a translation stage 548 on it. A front translation-bearing rod 208 is in place below the translation stage. Below the front translation-bearing rod 208 in FIG. 9, one V-shaped first arm 510 of an inverted set apparatus 502 for a casting/ printing press 519 is shown. The front translation-bearing rod 208 is magnetically attracted to the two set magnets 518, which hold the translation-bearing rod 208 in place. Each set magnet 518 is attached on an opposite side to one leg of the V-shaped first set arm 510. Here, the South end of the set magnet 518 is embedded in the V-shaped first set arm 510, and the North end of the set magnet faces the translation-bearing rod 208. The translation-bearing rod 208 is cradled in the V-shaped first set arm 510, which has a flat base 516.

FIG. 10 schematically illustrates a vertical cross-section taken across a translation-bearing rod 206 or 208 and an inverted V-shaped first arm 510. Set magnets 518 on the legs of the V-shaped arm 510 contact the translation-bearing rod 206 or 208 in two adjacent quadrants of the rod. The set magnet may be capped by a cushioning material that does not interfere with the magnetic attraction of the rod magnet. The base 516 of the V-shaped arm 510 is flat. An aperture 558 leads from the upper surface of the V-shaped arm 510 to the base of the set magnet 518. Once the translation-bearing rod 208 or 206 and the stage load magnets 556 are in place, a pneumatic grease gun (not shown) or the like is used to pump epoxy or a similar suitable liquid hardening substance into the apertures 558 leading to the embedded bases of the set magnets 518. All of the apertures 558 in the V-shaped arms are filled with the epoxy or the like, which fixes the set magnets 518 permanently in place in the V-shaped arms 510. Thus, the set apparatus 502 has two states: an unset state prior to alignment, and a fixed, aligned state after the alignment process herein.

Figure 11:
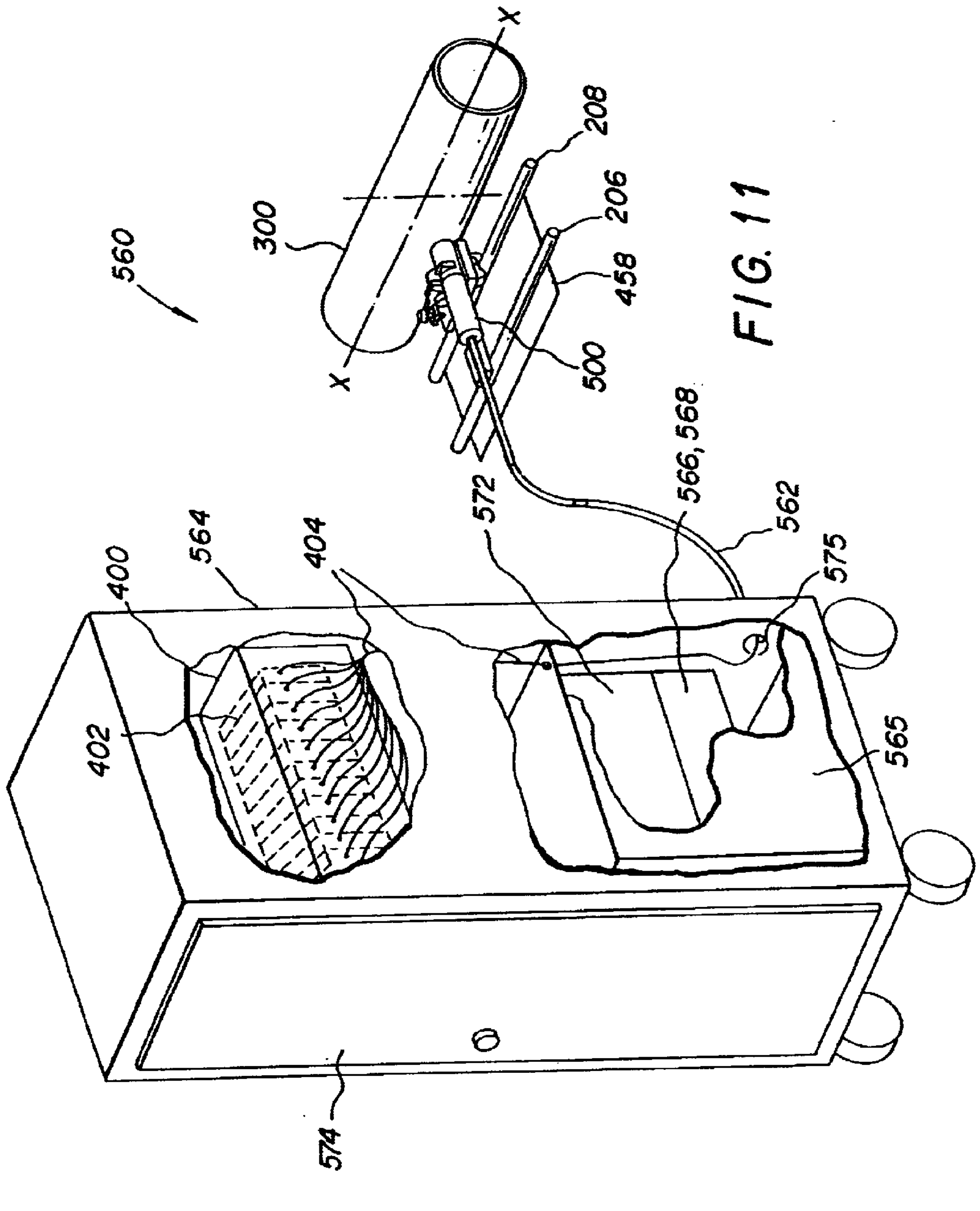
FIG. 11 is a perspective schematic view of an image processing apparatus according to the present invention, showing a separate image system housing.

FIG. 11 illustrates one possible arrangement of an imaging system 560 of the present invention. Above the parallel translation-bearing rods 206, 208 is a movable printhead 500 with its longitudinal axis perpendicular to the longitudinal (X) axis of a rotatable imaging drum 300, which is rotated by a motor. The printhead 500 is mounted on a lead screw 250, which moves the printhead 500 in a first direction. An aligned set apparatus 502 has been employed to align the imaging subsystem 458, including the translation-bearing rods 206, 208.

In this imaging system 560, print media 32 is removably mounted on the imaging drum 300 when the imaging system is in use. The printhead 500 is positioned to move over the print media 32 on the imaging drum 300. Connected to the opposite end of the printhead 500 is a conduit tube 562. The opposite end of the conduit tube is connected to a movable cabinet 564 or other image system housing, preferably with wheels on its base.

The image system housing is remote from the rest of the image processing apparatus, which is represented by the printhead 500 and imaging drum 300, in order to keep the laser assembly 400 and other equipment in the housing cool. There is also preferably a laser distribution box (not shown) between the lasers and the fiber optic cables 404. A number of fiber optic cables 404, preferably 64, emerge from the laser assembly 400. The upper portion of the cabinet housing 564 contains the laser assembly 400 comprising a plurality of laser diodes 402 connected to a plurality of fiber optic cables 404 connected to the printhead 500. At some point within the image system housing, the fiber optic cables 404 are bundled together so that they are easier to handle. The fiber optic cable bundle passes through the conduit tube 562. The end of the conduit tube 562 may be within the housing, but it is preferably affixed to an aperture 575 on the exterior of the image system housing 564.

The conduit tube 562 surrounds at least a portion of the fiber optic cables 404. The opposite end of the conduit tube 562 is connected to the back of the printhead 500. The imaging assembly could also be an ink jet assembly, in which case the connection means are tubes for conducting ink rather than fiber optic cables. The cables, tubes, or wires extend through the conduit tube to the printhead. There can be more than one connection tube within the conduit tube.

Continuing with FIG. 11, the cabinet housing 564 holds a second housing 565, which surrounds a cooler 566 for cooling ambient air and shunting it down the conduit tube 562 to the printhead 500, lead screw 250, imaging lens in the printhead, and the surrounding area. The cooler 566 preferably cools ambient air to a temperature of between about 50 and 80 degrees Fahrenheit. Cool air from the conduit tube keeps the printhead 500 stable, and prevents the imaging lens in the printhead and the printhead barrel from expansion. Since the fiber optic cables 404 are insulated and bundled, the cool air does not damage the cables inside the conduit tube 562.

The imaging system 560 may also include a blower 568, with the conduit tube 562 for channeling positive air flow from the blower 568 to the printhead 500. Frequently, foreign particles collect in the printhead area. Particles can be generated as a byproduct of oblating material during writing of the intended image. In the case of a printing press, for example, small ink particles are often generated from the ink rollers. When a printing plate is written in a printing press, a laser is focused on the printing plate, which vaporizes the media layer. The resulting particles, including dust, that collect in the printhead area can mar the image and over time cause parts of the image processing apparatus to function poorly. Positive air flow generated by the blower 568 helps to rid the printhead 500 and surrounding area of these particles, including dust.

A filtration system 570 is shown above the cooler 566 in FIG. 11. Although air can alternatively flow up through the filtration system, it ordinarily flows down through the filtration system 570 and then the cooler 566, and then down through the conduit tube 562 to the printhead 500 while the imaging system is working. The filtration system 570 filters ambient air before it enters the blower 568, and/or cooler 566, so that the foreign particle problem is not exacerbated by blowing additional particles into the printhead area through the conduit tube 562. Preferred filtration systems include replaceable filters. Any suitable filter may be used.

Alternatively, the imaging system 560 may include a vacuum blower 572 for channeling foreign matter from the area of the printhead 500 through the conduit tube 562. In this case, air flows from the printhead 500 up through the conduit tube 562, through the filtration system 570 in the second housing 565, and then to the vacuum blower 572. The air-borne particles are collected on the filter in the filtration system 570 under the vacuum blower 572. Since the image system housing 564 is preferably remote from the rest of the imaging apparatus, the filter is easily accessible. A preferred replaceable, removable filter can be accessed through a door 574 in the image system housing 564, as shown in FIG. 11. The image system housing 564 is preferably on wheels, so that it can be moved, though it is attached to the remainder of the apparatus by the umbilical-like conduit tube 562.

The imaging system 560 includes a control system so that the operator can regulate the amount of air flowing to the conduit tube, and/or the temperature of the air flowing to the conduit tube. The air may be cooled to a temperature sufficient to maintain the air around the printhead at approximately room temperature, or whatever temperature is considered optimal for that particular printhead or application. Keeping the printhead area and intended images free of foreign particles results in a cleaner image, reduces upkeep requirements, and decreases the number of malfunctions, which reduces the need for trouble-shooting. A cooler printhead means a longer lasting printhead and lead screw, and a better image, since the lens will not heat up as much. With cool air passing through it, the fiber optic tubing is not as likely to bum or melt in the high temperature environment inside the apparatus.

The imaging system 560 may alternatively include both a vacuum blower and a cooler with a positive air blower. This alternate embodiment includes a control system for controlling the outflow of cool air to the conduit tube, or the inflow of air under vacuum from the conduit tube. Alternatively, one or more centrifugal pumps (e.g. with tube rollers), or piston pumps can be employed instead of a cooler 566 or blower 568, 572. Cool air can be provided by an air conditioner, heat pumps, compressed air, freon, etc.

Figure 12:
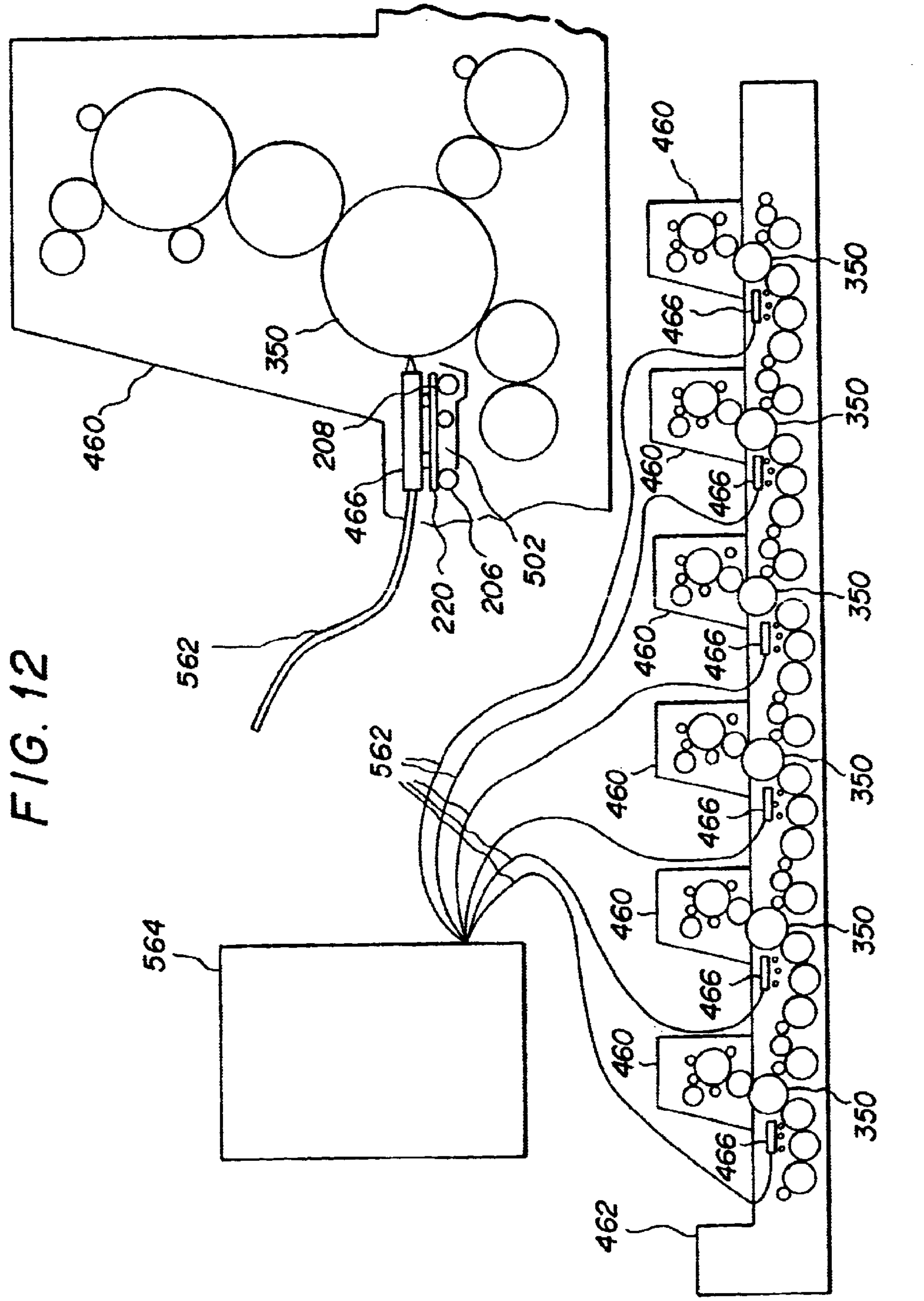
FIG. 12 is a schematic view of an image processing system according to the present invention, showing multiple stations in a printing press.

FIG. 12 shows one possible arrangement of several printing stations 460 built into a multiple-station image processing apparatus 462. For such an apparatus, the media being printed would be transported from printing station 460 to printing station 460, with each station 460 imaging with a different color. While the embodiment of FIG. 11 includes a single printhead 500, the embodiment of FIG. 12 includes multiple, printing press printheads 466. An aligned set apparatus 502 is employed to align each imaging subsystem.

As shown in FIG. 12, each printing station 460 has its own printhead 466 and a transfer drum, with corresponding support components as described hereinabove. The drum may be indirectly driven by the motor, as is the case where a motor directly drives a driven roller, and indirectly by associated tendency rollers. A translation stage member 220 under each printhead 466 includes the parallel translation-bearing rods 206, 208. The imaging subsystem, including the linear translation subsystem, is aligned with a fixed set apparatus 502. The longitudinal axis of each printhead 466 is aligned perpendicular axis to the longitudinal axis (X) of the drum. Each printhead 466 is movable relative to the longitudinal axis of its drum. The drums in the multiple station apparatus 462 are parallel to one another. Each station 460 includes a plurality of other rollers, such as ink transfer rollers.

While the embodiment of FIG. 11 includes one conduit tube 562 enclosing all of the fiber optic cables 404, the embodiment of FIG. 12 includes one conduit tube 562 for each printhead 466. One end of each conduit tube 562 is affixed to the separate image system housing 564. The opposite end of each conduit tube 562 is connected to a printing press printhead 466 at each printing station 460. Channeling cooling air to the printhead area through the conduit tube 562 can prevent melting of the conduit tube, and lessen contamination of, and wear and tear on, the printhead and other parts of the apparatus. Also, the blower or pump (positive or vacuum) reduces the amount of air-borne particles in the printhead area, thus decreasing the possibility of contamination of the printhead.

The present invention also includes a process for magnetically aligning an imaging subsystem, which comprises the steps of:

a) mounting translation-bearing rods 206, 208, and a drum axis tool 526 or a drum 300, in parallel in a master alignment fixture 534;

b) adjusting and aligning the translation-bearing rods 206, 208 along their length relative to the parallel drum axis tool 526 or drum 300;

c) placing a removable set apparatus 502 over the master alignment fixture 534, thereby removably attaching at least two pairs of magnets 518, which are loosely set on at least two, first pairs of arms 510 of the set apparatus 502, to the translation bearing rods 206, 208, and at least two magnets 518 on a second, extended pair of arms 511 of the set apparatus 502, to the drum axis tool 526 or drum 300;

d) fixing at least one pair of the magnets 518 on the set apparatus 502 in their adjusted positions;

e) removing the set apparatus 502 from the master alignment fixture 534; and f) inserting the set apparatus 502 in an imaging subsystem, with the set magnets on the translation-bearing rods and the magnets on the drum, and using the set apparatus 502 to align the imaging subsystem.

Step a) preferably further comprises mounting a lead screw tool rod 214 on the master alignment fixture 534 between the translation-bearing rods 206, 208; and Step b) preferably further comprises removably attaching at least two magnets 518 on at least one, third pair of arms 523 of the set apparatus 502 to the lead screw tool rod 214 on the master alignment fixture. The third pair of arms 523 (see FIG. 6) preferably resembles the first set of arms 510. Step c) preferably further comprises adjustment relative to the lead screw tool rod 214.

The master alignment fixture 534 preferably comprises a plurality of micrometers 546 along its length for measuring and adjusting the rods in relation to the drum axis tool 526 or drum 300, as shown in FIG. 6. In Step c), micrometers 546 on the master alignment fixture 534 are preferably used to measure and adjust the settings.

The set apparatus 502 preferably includes about four to eight generally V-shaped first pairs of arms 510, as shown in FIGS. 4, 9 and 10. An alternate embodiment includes one long, or several short, tunnel-shaped arm with strips of magnets along the inside sides of the tunnel rather than a number of V-shaped arms 510. As described hereinabove, the first, V-shaped arms 510 are preferably all alike and aligned so that the magnets 518 are in rows, with two rows per translation-bearing rod 206, 208 (see FIG. 4). Each row of magnets 518 removably attaches to a quadrant on the surface of one of the translation-bearing rods 206, 208 beneath the tube 506.

The set apparatus 502 preferably includes only one pair of the second arms 511 for removably grasping the drum axis tool 526, as shown in FIG. 4. The second arms 511 extend longer than the first arms 510 to grasp the drum axis tool 526 adjacent to the tube 506 and the translation bearing rods 206, 208, as shown in FIG. 6. A drum axis tool 526 is preferably used in the master alignment fixture 534 instead of an actual drum 300.

The magnets 518 attached to the V-shaped arms 510 are loosely set so they can move slightly during the adjustment step (c). In Step d), the set magnets 518 are fixed in place prior to the placement of the set apparatus 502 in the imaging subsystem. Step d) is preferably accomplished by injecting a suitable liquid hardening substance into apertures 558 in the V-shaped arms 510 using a pneumatic gun or the like. The apertures 558 lead to the bases of the set magnets 518, as shown in FIG. 10.

Once the magnets 518 are fixed in place, the set apparatus 502 can be used in the desired image processing apparatus. The master alignment fixture 534 is as perfectly aligned as possible, including the parallel translation-bearing rods 206, 208, and the magnet settings of the set apparatus 502 now mirror the master alignment fixture 534. The fixed set apparatus 502 copies the relationship of the translation-bearing rods and the lead screw tool 214 in the master alignment fixture 534. When the set apparatus 502 is placed into the subject image processing system, the set magnets 518 of the set apparatus 502 assure that the imaging system of the subject image processing system is also aligned and the translation bearing rods 206, 208, lead screw 250, and drum 300 are parallel.

The invention has been described in detail with particular reference to certain preferred embodiments thereof, but it will be understood that variations and modifications can be effected within the spirit and scope of the invention as described hereinabove and as defined in the appended claims by a person of ordinary skill in the art, without departing from the scope of the invention. While preferred embodiments of the invention have been described using specific terms, this description is for illustrative purposes only. It is intended that the doctrine of equivalents be relied upon to determine the fair scope of these claims in connection with any other person's product which fall outside the literal wording of these claims, but which in reality do not materially depart from this invention.

PARTS LIST

10. Image processing apparatus
12. Image processor housing
14. Image processor door
16. Donor ejection chute
18. Donor waste bin
32. Print media
34. Donor roll material
36. Donor material
50. Material trays
50*a*. Lower material tray
50*b*. Upper material tray
52. Media lift cams
52*a*. Lower media lift cam
52*b*. Upper media lift cam
54. Media rollers
54*a*. Lower media roller
54*b*. Upper media roller
56. Media guide
58. Media guide rollers
60. Media-staging tray
100. Media carousel
110. Media drive mechanism
112. Media drive rollers
120. Media knife assembly
122. Media knife blades
200. Lathe bed scanning subsystem
202. Lathe bed scanning frame
204. Entrance passageway
206. Rear translation-bearing rod
208. Front translation-bearing rod
210. Translation system
214. Lead screw tool rod
216. Drum axis tool
241. Tool rod for lead screw
220. Translation stage member
250. Lead screw
252. Threaded shaft
254. Lead screw drive nut
258. Translator drive linear motor
260. Axial load magnets
260*a*. Axial load magnet
260*b*. Axial load magnet
262. Circular-shaped boss
264. Ball bearing
266. Circular-shaped insert
268. End cap
270. Hollowed-out center portion
272. Radial bearing
300. Imaging drum
301. Axis of rotation
302. Drum housing
304. Hollowed-out interior portion
350. Load roller
400. Laser assembly
402. Laser diodes

404. Fiber optic cables
458. Imaging subsystem
460. Printing station
462. Multiple-station image processing apparatus
464. Printing press rollers
466. Printing press printhead
468. Printing press imaging subsystem
500. Printhead
501. Alignment system
502. Set apparatus
504. Arm plates
504*b*. Extended arm plate
506. Torque tube
508. Tube hollow
510. First set arm
511. Second, extended arm
512. Lower plate end
514. Upper plate end
516. Base of first, V-shaped arm
518. Set magnets
519. Printing press
520. Extension of second arm
522. Elbow
523. Third arm
524. Extension arm plate
526. Drum axis tool
528. Drum axis tool handle
530. Cinch collet
532. Drum screw axis
534. Master alignment fixture
535. Master fixture arm
536. Table
537. Master fixture base
538. Fixture blocks
539. Master fixture base plate
540. Drum columns
542. End bores in columns
544. End plates
546. Micrometers
548. Translation stage
550. Fourth arm
552. First bearing pad
552*b*. Second bearing pad
554. Base of fourth arm
556. First stage load magnet
556*b*. Second stage load magnet
558. Aperture
560. Imaging system
562. Conduit tube
564. Imaging system housing
565. Second housing
566. Cooler
568. Positive air blower
570. Filtration system
572. Vacuum blower
574. Housing door

What is claimed is:

1. An accurate system for magnetic alignment of an imaging subsystem, the alignment system comprising:

1) a master alignment fixture, comprising: a) two like, magnet-attracting translation-bearing rods; b) a drum axis tool or drum; c) a means for supporting the translation-bearing rods in a parallel, planar relationship to one another; d) a means for supporting the drum axis tool or drum in a parallel relationship to the translation-bearing rods; and e) a means for measuring and aligning the translation-bearing rods in relation to the parallel drum axis tool or drum; and 2) a removable set apparatus that is attachable to the top of the master alignment fixture, the set apparatus comprising: a) a tube or rod; b) a plurality of aligned first set arms extending in a downward direction from the tube or rod, at least one magnet being attached to each first set arm, the first set arms being above and in close proximity to the translation-bearing rods when the set apparatus is on the master alignment fixture, the magnets of the first set arms being detachably attachable to the translation-bearing rod; and c) at least two second, extended arms projecting from a side of the tube or rod, the second, extended arms being detachably attachable to the drum axis tool or drum.

2. An alignment system according to claim 1 further comprising a base for supporting the remainder of the master alignment fixture, the translation-bearing rod support means and the drum support means being mounted on the base.

3. An alignment system according to claim 2 wherein the base further comprises a plurality of parallel fixture blocks, which support the translation-bearing rods.

4. An alignment system according to claim 3 wherein the base further comprises a base plate, the parallel fixture blocks being mounted in a row on the base plate.

5. An alignment system according to claim 4 wherein the translation-bearing rod support means on the master alignment fixture is a plurality of master fixture arms supported by the base, each master fixture arm extending in an upward direction from a fixture block, the master fixture arms forming two rows beneath the translation-bearing rods, each translation-bearing rod being received by a row of the master fixture arms.

6. An alignment system according to claim 5 wherein the means for supporting the drum axis tool of the master alignment fixture is two spaced apart, parallel drum columns mounted on the base plate adjacent to the fixture blocks.

7. An alignment system according to claim 5 wherein the master fixture arms are V-shaped or U-shaped, and cushioning pads are attached to the inside surface of legs of the master fixture arms.

8. An alignment system according to claim 1 wherein the means for measuring and aligning the master alignment fixture is a plurality of micrometers set along the fixture blocks.

9. An alignment system according to claim 8 wherein the master alignment fixture further comprises a lead screw tool rod on the master alignment fixture between the translation-bearing rods, and a means for supporting the lead screw tool rod; wherein the micrometers align the translation-bearing rods, in relation to the lead screw tool rod, and the parallel drum axis tool or drum.

10. An alignment system according to claim 9 wherein the means for supporting the lead screw tool rod is a plurality of third set arms between the two rows of first set arms.

11. An alignment system according to claim 1 wherein the second, extended arms are generally V-shaped and comprise magnets attached to each leg of the second, extended arm for detachable magnetic attachment to the drum axis tool.

12. An alignment system according to claim 11 wherein the second, extended arms of the set apparatus are the same length as the distance in the master alignment fixture between the tube or rod and the drum axis tool.

13. An alignment system according to claim 11 wherein the set apparatus comprises between about four and eight of the first set arms, which are generally V-shaped with a flattened base, and wherein one of the set magnets is attached to each leg of each of the first set arms.

14. An alignment system according to claim 13 wherein the V-shaped first set arms of the set apparatus are all identical, the first set arms being attached at one end to an arm plate, the parallel arm plates encircling the tube, which is a torque tube.

15. An alignment system according to claim 14 wherein the magnets in the V-shaped first set arms are in rows, with two rows per translation-bearing rod, each row of magnets of the set apparatus being removably attachable to a surface of one of the translation-bearing rods beneath the torque tube.

16. An alignment system according to claim 11, wherein the V-shaped first set arms each comprise an aperture leading to an embedded base of each of their set magnets.

17. A process for magnetically aligning an imaging subsystem, the process comprising the steps of:

a) mounting one or two translation-bearing rods, and a drum axis tool or a drum, in a master alignment fixture;

b) placing a removable set apparatus over the master alignment fixture, thereby removably attaching at least two loosely set magnets on at least one, first pair of arms of the set apparatus to the translation-bearing rods, and at least two magnets on a second, extended pair of arms of the set apparatus to the drum axis tool or drum;

c) adjusting the translation-bearing rods relative to the drum axis tool or drum;

d) fixing the translation-bearing rod magnets on the set apparatus in their adjusted positions;

e) removing the set apparatus from the master alignment fixture; and f) inserting the set apparatus in an imaging subsystem of an image processing apparatus for aligning the imaging subsystem.

18. A process according to claim 17 wherein Step a) further comprises mounting a lead screw tool rod on the master alignment fixture between the translation-bearing rods, and Step b) further comprises removably attaching at least two magnets on at least one, third pair of arms of the set apparatus to the lead screw tool rod on the master alignment fixture.

19. A process according to claim 18 wherein Step c) further comprises adjusting the translation-bearing rods relative to the lead screw tool rod and the drum axis tool or drum.

20. A process according to claim 17 wherein Step c) further comprises the step of measuring prior to adjusting the translation-bearing rods relative to the drum axis tool, using micrometers on the master alignment fixture.

21. A process according to claim 17 wherein Step d) further comprises injecting a liquid hardening substance into apertures in the first set arms, the apertures leading to embedded bases of the set magnets.

* * * * *